United States Patent

Kim

[15] 3,696,953
[45] Oct. 10, 1972

[54] COMBINATION CAMPER VEHICLE AND BOAT

[72] Inventor: Sunyong P. Kim, 1350 W. Jefferson Boulevard, Apt. No. 1, Los Angeles, Calif. 90007

[22] Filed: March 11, 1971

[21] Appl. No.: 123,337

[52] U.S. Cl. ............................................. 214/450
[51] Int. Cl. ............................................. B60r 9/00
[58] Field of Search ................... 214/450, 83.24, 517

[56] References Cited

UNITED STATES PATENTS

| | | | |
|---|---|---|---|
| 3,128,893 | 4/1964 | Jones | 214/450 |
| 3,495,729 | 2/1970 | Kruse | 214/450 |

*Primary Examiner*—Gerald M. Forlenza
*Assistant Examiner*—John Mannix
*Attorney*—John T. Matlago

[57] ABSTRACT

Apparatus is disclosed for automatically loading and unloading a boat relative to the top of a camper vehicle. The apparatus provides a movable linkage mechanism adapted to be secured to the top of the vehicle. A pair of parallel arms connected to the gunwales of a boat is supported on the movable linkage mechanism. A spring means is provided for enabling the movable linkage mechanism to rotate the arms with the boat thereon in one direction, and a cable means is provided for enabling the movable linkage mechanism to rotate the arms with the boat thereon in the opposite direction. The movable linkage mechanism is effective in reducing the height of the swing of the boat being rotated through an arc of 180 ± between a rest position contingent to the ground in the back of the camper vehicle and an inverted rest position on the top of the vehicle, and is further effective in balancing the boat on the movable linkage mechanism during the swinging thereof such as to facilitate and minimize the power required to accomplish the movement.

10 Claims, 9 Drawing Figures

INVENTOR
Sunyong P. Kim
By John J. Matlago
Attorney

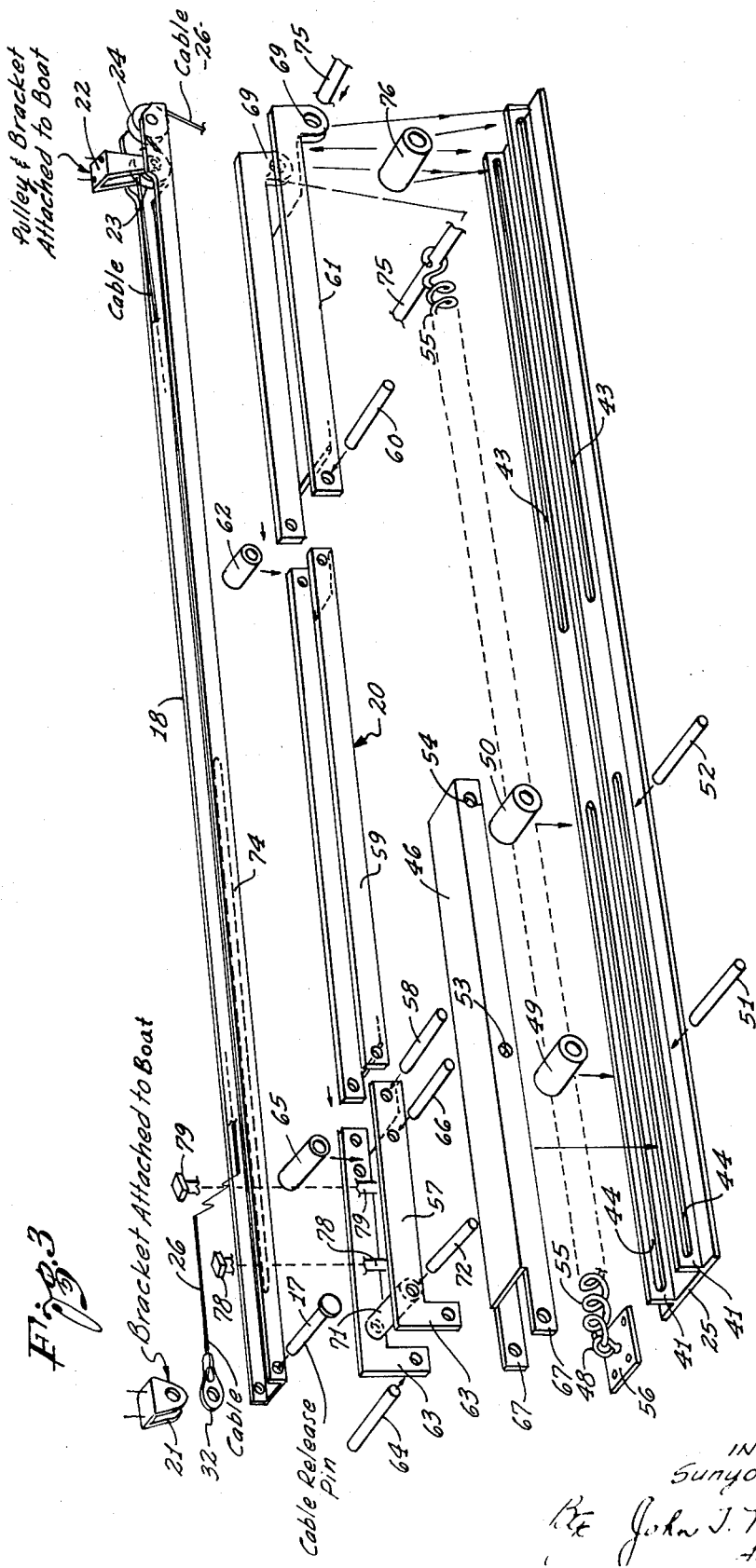

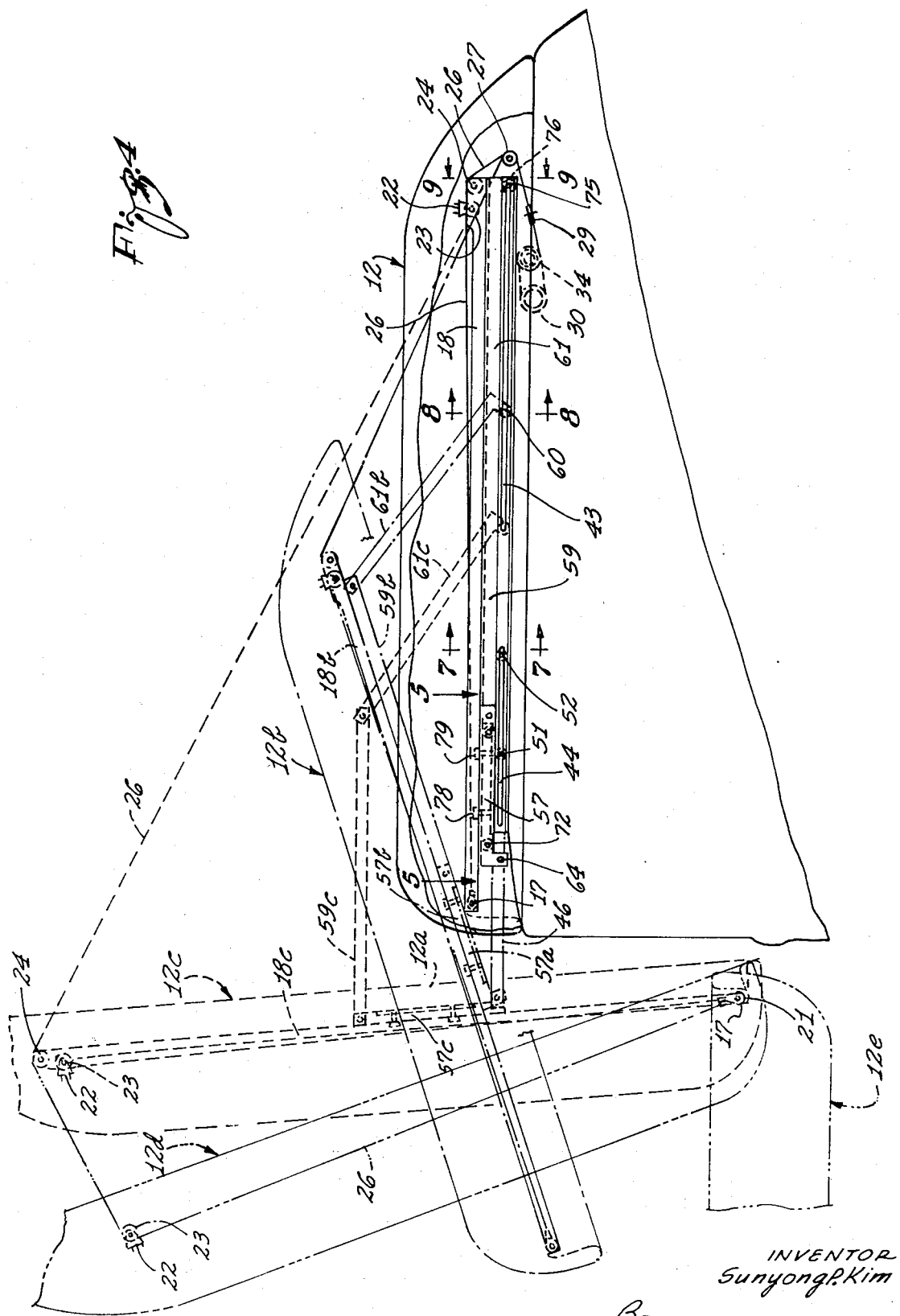

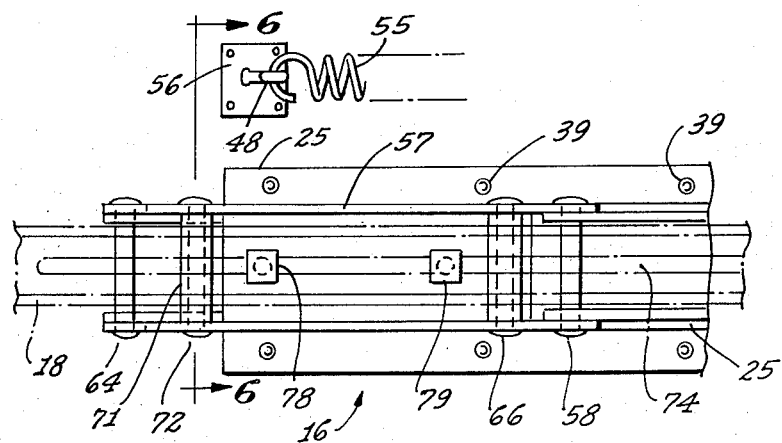
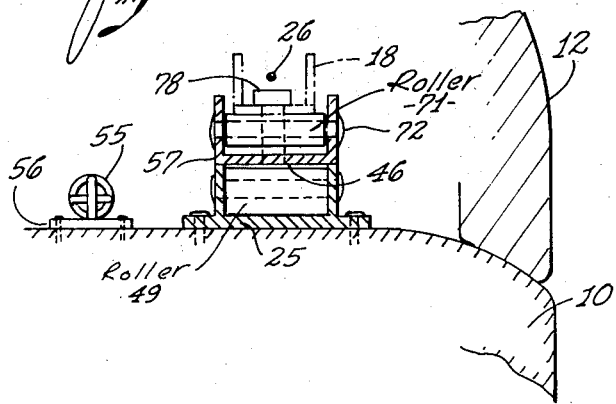
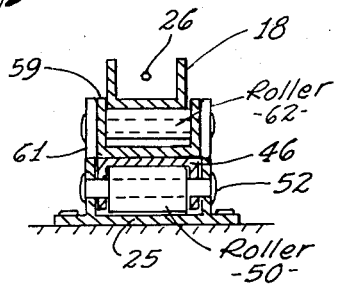
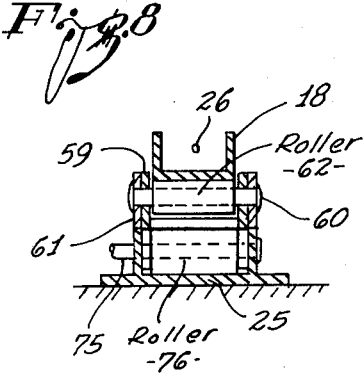
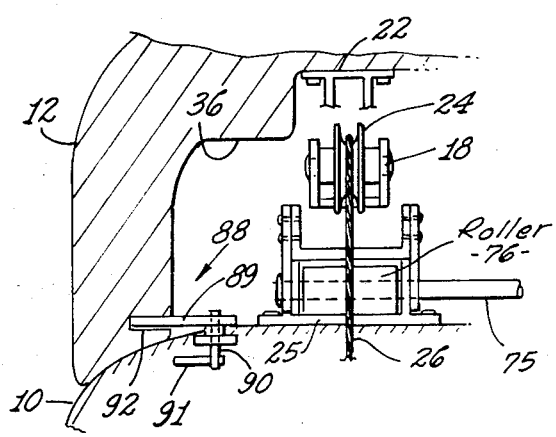

COMBINATION CAMPER VEHICLE AND BOAT

This invention relates to apparatus for loading a boat on and unloading a boat from the top of a camper vehicle and more particularly to novel apparatus carried by the vehicle for automatically accomplishing these results.

In the interest of camping it is desirable to be able to transport a boat in an inverted position on the flat top of a camper vehicle, the boat being provided with an outer contour that conforms with the body of the camper and being adapted to be so positioned on the top of the camper that it gives the impression of being an extension of the roof thereof. In fact the present invention contemplates that the inverted boat serves to provide additional head room within the camper when the top of the camper is of the type provided with an opening therein. In addition to thus providing a combination boat and camper which is functional and has a pleasing appearance, it is highly desirable to be able to provide apparatus on the camper vehicle which when actuated by a switch will operate to automatically move the boat from its inverted position on the top of the camper vehicle to a position on the ground behind the vehicle where it can be simply disconnected for use; and where, after it has been used, the boat can be again connected to the apparatus which in response to the actuating of the switch will operate to automatically return the boat to its inverted position for transportation on the top of the camper vehicle.

The present invention provides apparatus for accomplishing these results by providing for rotating the boat from its inverted position on the flat top of the vehicle by swinging the hull or forward end of the boat upwardly and around through an angle of 180° while concurrently lowering the stern end of the boat down to its position contingent to the ground. The apparatus further provides for returning the boat to its inverted position on the top of the vehicle by effectively reversing the movement of the boat. Although such a movement of the boat is simple it is not very practical if the apparatus requires that the front end of the boat swing upwardly at considerable height above the top of the vehicle, or if the boat is not properly balanced on the apparatus during the rotation in which event a large amount of power is required to operate the apparatus.

The present invention overcomes these problems by providing a movable linkage mechanism for controlling the movement of the boat which is effective in reducing the extent of the height travelled by the forward end of the boat during its swing by providing for a longitudinal shifting movement of the boat downwardly during the swinging action of the boat. Not only does this make it possible for the boat to be swung about a 180° angle without requiring that the forward end extend as high above the top of the camper vehicle, but it further makes it possible for the boat load to be better distributed and balanced on the movable linkage mechanism such that less power is required to control and actuate the movement.

Accordingly, one of the objects of the present invention is to provide a boat loader and unloader mechanism which is attached to the top of a camper vehicle and which provides for automatically moving a boat in either direction between a rest position in proximity to the ground at the rear of a camper vehicle an an inverted transporting rest position on top of the camper vehicle.

Another object of the invention is to provide for moving a boat between a position in proximity to the ground to a position in which it resides in an inverted position on the top of a camper vehicle, and vice versa, by providing for the front end of the boat swinging upwardly, over and downwardly through an angle of 180°.

Another object of the invention is to provide for positioning and securing a boat in an inverted position on the top of a camper vehicle whereby the boat effectively serves as an extension of the roof of the vehicle.

Yet another object of the invention is to provide a novel linkage and supporting mechanism which is effective in reducing the height of the swing of a boat being rotated through an arc of 180° between a rest position on the ground in the back of a camper vehicle and an inverted rest position on the top of the vehicle and which is further effective in balancing the boat during the swinging thereof such as to facilitate and minimize the power required to accomplish the movement.

With these and other objects in view, the invention consists of the construction, arrangement and combination of the various parts of the device, whereby the objects contemplated are attained as herein set forth, pointed out in the appended claims and illustrated in the accompanying drawings:

Referring to the drawings:

FIG. 3 is a perspective exploded view showing the parts comprising a rack assembly;

FIG. 4 is a side view of the camper vehicle showing in solid lines the boat in its position on the top thereof and showing in broken lines successive positions of the boat as it is automatically swung by the movable linkage mechanisms of the rack assemblies toward a lowered position on the back of the camper vehicle;

FIG. 5 is a top plan view of the rear portion of the rack assembly as taken along lines 5—5 of FIG. 4;

FIG. 6 is a cross-sectional view of the rack assembly as taken along lines 6—6 in FIG. 5.

FIG. 7 is a cross-sectional view of the rack assembly as taken along lines 7—7 in FIG. 4;

FIG. 8 is a cross-sectional view of the rack assembly as taken along lines 8—8 in FIG. 4; and FIG. 9 is an end view of the rack assembly as taken along lines 9—9 in FIG. 4.

Figure 1:
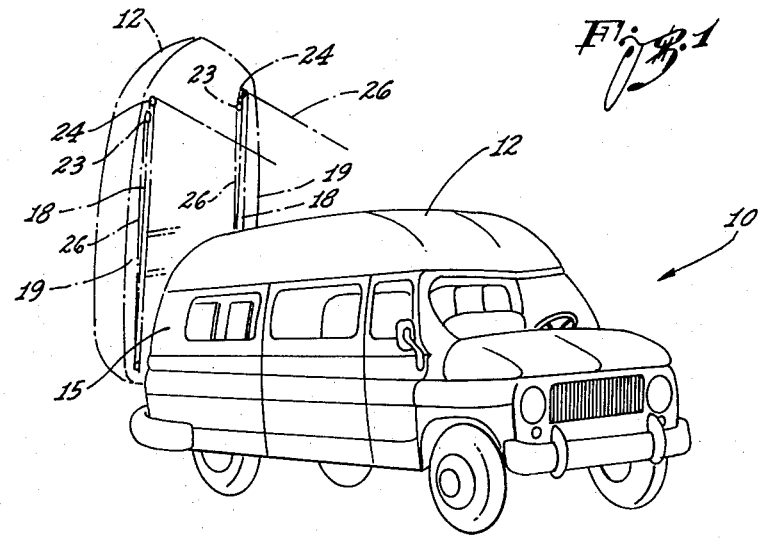
FIG. 1 is a perspective view of a camper vehicle showing in solid lines a boat in inverted position on the top thereof and showing in broken lines the boat being removed from the top of the camper vehicle.
Figure 2:
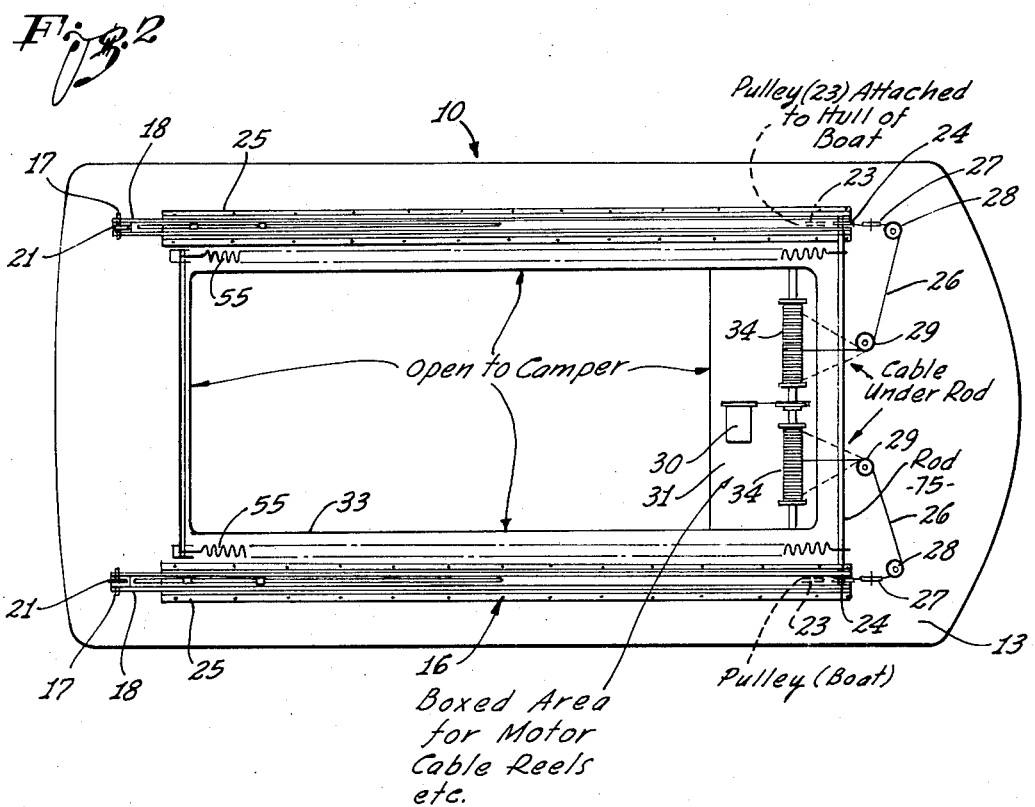
FIG. 2 is a top plan view of the camper vehicle showing the pair of rack assemblies attached on the roof thereof which provide the apparatus for automatically loading and unloading the boat relative to the top of the camper vehicle.

Referring to the drawings, a camper vehicle 10 is illustrated which is adapted to have an inverted boat 12 fitted on the top thereof. The boat is preferably formed of fiber glass having a shape which generally conforms with the contour of the flat top 13 of the camper vehicle 10. The inside surface of the boat 12 is formed with a depression 36 (FIG. 9) along the length thereof to enable the boat to be positioned on a pair of longitudinal rack assemblies 16 attached to either side of a rectangular opening 33 provided on the top of the vehicle, as shown in FIG. 2. When so positioned the lower edges of the boat are adapted to generally rest along the edges of the top of the camper vehicle 10.

The detail structure of the pair of rack assemblies 16 will next be described in connection with FIG. 3. As shown, each rack assembly 16 includes a base 25 having longitudinal sidewalls 41 provided with a front elongated slot 43 and a rear elongated slot 44. Mounted on the rear portion of each rack assembly 16 is a short extension member 46 formed of a channel structure whose sides fit within the opening on base 25 provided by the side walls 41. The member 46 is connected to move relative to base 25 by spaced rollers 49 and 50 riding on pins 51 and 52, respectively, which pass through holes 53 and 54 on the sides of member 46. The ends of pins 51 and 52 extend through the elongated slots 44 in the side walls 41 of the base 25. It is thus seen that the extension member 46 is longitudinally movable relative to the base 25 from an inner position in which pin 52 contacts the front end of slots 44 to an outer position in which pin 51 contacts the rear end of the slots 44.

Positioned above base 25 and coextensive with the length thereof is a movable linkage mechanism 20 comprising three linkage members, a rear linkage member 57, a middle linkage member 59, and a front linkage member 61. The outer end of the rear linkage member 57 is provided with a pair of vertical legs 63 which are connected by a hinge pin 64 to the outside walls 67 of the extension member 46. The outer end of the front linkage member 61 is connected by a pair of vertical legs 69 to a cross rod 75 which passes through a roller 76 positioned between sidewalls 41 of the base 25 and extends through the front slots 43. The rear end of middle linkage member 59 is connected to the front end of the rear linkage member 57 by a hinge pin 58, and the front end of middle linkage member 59 is connected to the rear end of the front linkage member 61 by a hinge pin 60 supporting a roller 62. It should be particularly noted that the front vertical legs 69 of member 61 of linkage mechanism 20 are attached by cross rod 75 to move on roller 76 relative to the base 25, and the rear vertical legs 63 of the member 57 of linkage mechanism 20 are attached by hinge pin 64 to the rear end of the extension member 46 which in turn is attached to move relative to the base 25 on rollers 49 and 50.

Positioned above movable linkage mechanism 20 to be supported for movement parallel to the rear linkage member 57 thereof is an arm 18 having a length a little longer than base 25. Arm 18 is formed of channel having a width which fits within the walls of the channel forming the middle linkage member 59, (FIG. 7). Rollers 65 and 71 are positioned on respective pins 66 and 72 spanning the sides of rear linkage member 57. Likewise roller 62 is positioned on a hinge pin 60 connecting the end of middle linkage member 59 to the end of the front linkage member 61. The arm 18 thus rests on rollers 62, 65 and 71. Extending along the rear portion of the bottom of the arm 18 is an elongated slot 74. A pair of lug bolts 78 and 79 inserted with their heads above the slot 74 are connected to the bottom of the rear linkage member 57 for holding the arm 18 onto the member 57. This arrangement provides for the arm 18 to be held onto the rear linkage member 57 while being movable on rollers 62, 65 and 71 relative thereto. The arm 18 is movable to the front until the lug bolt 78 contacts the rear end of the slot 74 while the arm 18 is movable to the rear until the lug bolt 79 contacts the front end of the slot 74.

The rearward end of the arm 18 is pivotally connected to the boat 12 by a release pin 17 passing through a bracket 21 fastened on the side of the stern of the boat 12. A cable 26 having its end 32 hooked on pin 17 extends along the length of arm 18, about a pulley 23 attached to the side of the hull of the boat 12 by a bracket 22, about a pulley 24 held on the free end of the arm 18, and continues on about fixed pulleys 27, 28 and 29 to a reel 34 located in a boxed area 31 on the front of the roof opening 33 of the camper vehicle 10. (FIG. 2) A spring 55 is positioned adjacent the rack assembly 16. Spring 55 has one of its ends attached to a hook 48 held by a bracket 56 on the top of the vehicle 10 adjacent the rack assembly 16 and has its other end attached to the cross rod 75.

It should now be clear that when the parts comprising the rack assembly 16 are in their closed position, as when the boat 12 is resting on its sides or gunwales 19 in its inverted position on the vehicle, movable linkage mechanism 20 is horizontally disposed on the base 25, the extension member 46 is moved to its forwardmost position within the sidewalls 41 of base 25, and the arm 18 with it rearward end attached by release pin 17 to the boat 12 is disposed in its forwardmost position above the mechanism 20. Thus as shown in FIG. 6 which is a cross-section of the rack assembly 16 in its closed position, as taken along lines 6—6 of FIG. 5, the roller 71 on which arm 18 rests is shown positioned between the sides of the rear linkage member 57. Furthermore the roller 49 with extension member 46 positioned on the top thereof is shown mounted by pin 51 between the sidewalls 41 of the base 25. FIG. 7, which is a cross-section of the rack assembly 16 in its closed position, as taken along the lines 7—7 of FIG. 3, shows the extension member 46 resting on roller 50 which is held by pin 52 to roll on base 25 within the side walls 41 thereof. FIG. 7 also shows the arm 18 being guided by the walls of the channel structure forming middle linkage member 59. In FIG. 8, a cross-section is shown of the rack assembly 16 in its closed position as taken along lines 8—8 of FIG. 3. Thus Fig. 8 shows the hinge pin 60 with the roller 62 thereon which interconnects the ends of the middle linkage member 59 and the front linkage member 61. FIG. 8 further shows the arm 18 resting on roller 62 while being confined within the walls of the channel structure forming middle linkage member 59.

It should be understood that the right rack assembly 16 on the right side of the top of camper vehicle 10 is the same as the left rack assembly 16 shown in FIG. 3. It should be further noted that the same cross-rod 75 which attaches the vertical legs 69 of the front linkage member 61 to the slots 43 on the base 25 of the left rack assembly 16 also provides for attaching the vertical legs 69 of the front linkage member 61 to the slots 43 on the base 25 of the right rack assembly 16, thus assuring that the pivots of these linkage members are aligned. In addition a spring 55 is similarly provided on the right side of the top of vehicle 10 with its rear end secured to the top of the vehicle and its forward end attached to the cross bar 75 confined to move within slots 43 of the bases 25. Furthermore, it should be noted that the length of cable 26 on the right side of the camper vehicle 10 is connected to pin 17 which holds arm 18 to the stern of the boat 12 and passes over pulley 23 on the hull of the boat, the pulley 24 on the free end of arm 18, and over fixed pulleys 27, 28 and 29 to reel 34, in a manner similar to that provided for connecting the length of cable 26 on the left side of the vehicle 10.

In order to describe the operation of the rack assembly 16, it should be noted that the springs 55 exert a pull on the front ends of the front linkage members 61 toward the rear of the camper vehicle 10 such as to cause the linkage member 61, 59, and 57 to pivot upwardly as will be described, infra, for the purpose of tilting and rotating the arms 18 supported on member 57. On the other hand the lengths of cables 26 attached to the pins 17 on the rear ends of the arms 18 and directed down around fixed pulleys 27 when taken up on the reels 34, pull the rear linkage members 57, the middle linkage members 59 and the front linkage members 61 toward the front of the camper vehicle 10, thus holding movable linkage mechanism 20 and the arms 18 attached thereto flat in their frontmost position in which the boat 12 is positioned to function as a extension of the roof for the vehicle 10.

As shown in FIG. 4, when it is desired to unload the boat 12 from the top of the camping vehicle 10, the motor 30 is energized to rotate the reels 34 to loosen the cables 26. When this happens the extension members 46 on each of the rack assemblies 16 move to the rear until the pins 51 contact the rear ends of the slots 44 in the bases 25. The movable linkage mechanisms 20 including parallel arms 18 and the boat thereon are moved as a unit to the rear such that the boat 12 supported on the upper surface of the arms 18 is moved to the position indicated as 12a in FIG. 3. When in this position the boat extends outwardly for a short distance beyond the rear end of the camper vehicle 10. As the cables 26 are further released by rotating the motor 30 the springs 55 are permitted to pull the cross rod 75 and consequently the outer vertical legs 69 of front linkage members 61 still further to the rear causing the front linkage members 61 and the middle linkage members 59 to assume angular positions as indicated by 57b, 59b, and 61b. Note that the relative pivoting of members 59 and 61 is limited by a stop pin (not shown) located on one of the ends thereof. As a result of this action the parallel arms 18 with the boat 12 resting thereon are tilted upwardly. This causes the arms 18 and the boat 12 to slide downwardly to the rear on the rollers 62, 65 and 71, under the influence of gravity, until the pins 66 on rear linkage members 57 contact the rear ends of the slots 74 on the arms 18 such that the boat 12 is positioned as indicated at 12b. As a result of the boat sliding downwardly to the rear, the weight of the boat which is concentrated in the stern portion is balanced on the rear linkage members 57. The balancing of the weight of the boat coupled with the action of the springs 55 causes the arms 18 and thus the boat 12 attached to the ends thereof to be readily pivoted further about the rear linkage members pivot pins 64 thus causing the rear linkage members 57 to straighten upwardly to the position indicated by 57c as the lower ends of the front linkage members 61 are pulled still further to the rear by the springs 55 to a position indicated by 61c, thus placing the boat 12 in the position as indicated by 12c. Here again, the relative pivoting of members 59 with respect to members 57 is limited by a stop pin (not shown) on one of the ends thereof. Since the arms 18 are attached to the rear linkage members 57, the arms 18 are likewise restricted from any further rotation.

As the cable 26 is still further released, the boat 12 pivots on hinge pins 17 about the lower ends of the arms 18, as indicated by position 12d. The boat is then gradually lowered to ground level to a position behind the camper vehicle 10, as indicated by 12e. By removing the release pins 17 on the ends of the arms 18, the boat is disconnected from the vehicle 10.

It should be now understood that the reverse action of automatically lifting the boat and positioning it on the top of the camper vehicle 10 is a reversal of the action so far described and is obtained by reversing the motor 30 and tightening up on the cables 26 by rotating the reels 34 such as to overcome the action of springs 55.

The reverse action is such that upon operation of the reels 34, the forward end of the boat 12 is lifted from the ground by the cables 26 passing through pulleys 23 and pivoted upwardly toward the arms 18 through an angle of slightly less than 90° until the gunwales the boat 12 rest up against the arms 18. The arms 18 are at this time held by the action of the springs 55 to extend upwardly at an angle of slightly less than 90° and are attached at an intermediate portion thereof to linkage members 57 of the movable linkage mechanisms 20. Further operation of the reels 34 causes the linkage mechanisms 20 to be pulled forward by cables 26 against the action of springs 55 such that linkage members 57 are aligned with the middle linkage members 59 as indicated by positions 57b and 59b in FIG. 4. The inner ends of the right linkage members 61 which at this time are at the position indicated by 61b then tend to straighten out to the closed horizontal position as the parallel arms 18 with the boat supported thereon begins to settle down to their rest position on the top of the vehicle 10. Continual tightening of the cables 26 then pulls the boat 12 to the front until the lug bolts 78 on members 57 contact the rear ends of slots 74 on the underside of arms 18 which provide for stopping the boat in the proper position on the top of the vehicle 10. If the boat is to be transported by the vehicle 10, the boat 12 is preferably locked onto the roof of the vehicle 10 by clamping devices spaced along the edges thereof, such as the clamp 88 shown in FIG. 9 which is a front end view of the rack assembly 16 as taken along the direction of arrows 9—9 in FIG. 4. As shown, clamp 88 comprises a latch member 89 attached on the top of a shaft 90 which extends below the top of the camper vehicle. Upon rotating lever 91 on the lower end of the shaft 90, the latch member 89 is rotated into a slot 92 provided on the inside wall of the boat.

From the above description it will be apparent that there is thus provided a device of the character described possessing the particular features of advantage before enumerated as desirable, but which obviously is susceptible of modification in its form, proportions, detailed construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect and the invention is therefore claimed in any of its forms or modifications within the legitimate and valid scope of the appended claims.

What is claimed is:

1. Apparatus for loading and unloading a boat on the top of a camper vehicle comprising:
    a pair of base members each adapted to be secured along a longitudinal side of the top of a camper vehicle;
    a pair of movable linkage mechanisms, each said mechanisms supported on a respective one of said base members and each said mechanisms including a linkage member capable of having a horizontally disposed position on said base member or an angularly disposed position in which it is leaning toward the rear of said vehicle;
    a pair of arms, each said arms supported on and slidably movable relative to a respective one of said linkage members and each said arms connected by pivots at one end thereof to the opposite sides of the stern of a boat and extending along the opposite gunwales of the boat;
    spring means acting to rotate said linkage members of said movable linkage mechanisms to their angularly disposed position to thereby rotate said arms and the boat connected thereto toward the rear of said vehicle; and
    cable means capable of being released to permit said spring means to act to rotate said linkage members to their angularly disposed position and capable of being taken up to overcome the action of said spring means for returning said linkage members to their horizontally disposed position on said base members;
    whereby when said cable means is released said spring means causes the linkage members of said movable linkage mechanisms to tilt upwardly thereby causing the arms with the boat resting thereon to be shifted rearwardly and downwardly relative to said linkage members to thereby lower the stern end of the boat and provide for the boat to be balanced on said movable linkage mechanisms to facilitate the further rotation of said arms and boat by said spring means to said angularly disposed position in which said boat is leaning toward the rear of said vehicle;
    and whereby when said cable means is taken up said movable linkage mechanisms including said linkage members are drawn to their horizontally disposed position on said base members in which said boat is held in an inverted position on the top of said vehicle.

2. The invention is accordance with claim 1 wherein further release of said cable means provides for lowering said boat from its angularly disposed position adjacent said arms to a position contingent to the ground on the rear of the vehicle by rotating said boat about the pivots on the ends of said arms being held by the movable linkage mechanisms in said angularly disposed position.

3. The invention in accordance with claim 2 wherein taking up said cable means provides for raising said boat from its position contingent to the ground to said angularly disposed position by rotating said boat about the pivots on the ends of the arms being held by the movable linkage mechanisms in said angularly disposed position.

4. The invention in accordance with claim 1 including a longitudinally moving extension member supported on the rear portion of each said base member, said movable linkage mechanisms being connected to said extension members, and whereby said spring means provides for longitudinally moving said extension members and the movable linkage mechanisms with the arms of the boat thereon to a position extending beyond the rear of the vehicle.

5. The invention in accordance with claim 1 wherein each said movable linkage mechanism includes:
    a rear linkage member;
    a front linkage member; and
    an interconnecting linkage member;
    said front linkage member having front vertical legs pivotally connected to said base member and longitudinally movable relative thereto,
    said rear linkage member having rear vertical legs pivotally connected to said extension member,
    said rear linkage member and said interconnecting linkage member providing for positioning said rear linkage member, and
    said arm associated with each movable linkage mechanism being connected to rotate in accordance with and to be movable along the length of said rear linkage member.

6. The invention in accordance with claim 5 wherein each said base member is a channel structure provided with longitudinal slots along the front portion of the sidewalls thereof;
    wherein a cross rod is provided in said slots for pivotally connecting said vertical legs of said front linkage member to the base member; and
    wherein said spring means includes a pair of springs, each spring having one end attached to the top of the camper vehicle adjacent the rear end of one of the base members, and the other end connected to said cross rod.

7. The invention in accordance with claim 6 wherein each said rear linkage member is provided with roller means on which said arm rests for movement relative to said rear linkage member.

8. The invention in accordance with claim 1 including reel means; and
    a pulley attached to the free end of each of said arms; and
    wherein said cable means includes a pair of cables, each cable being connected to one side of the hull end of the boat and passing over the pulley on the end of said arm to said reel means.

9. The invention in accordance with claim 1 wherein the body of said boat is formed with an outer contour that conforms with the body of the vehicle and is so adapted to be positioned in its inverted position on the top of the vehicle that it gives the impression of being an extension of the roof thereof.

10. The invention in accordance with claim 9 including clamping means for further securing said boat in an inverted position on the top of said vehicle.

* * * * *